B. KROCKER.
PUMP-VALVE.

No. 184,014. Patented Nov. 7, 1876.

Witnesses:
Georg Baukes
A. v. Eberty

Inventor:
B. Krocker
by Carl T. Burchard
his Atty.

UNITED STATES PATENT OFFICE.

BERTHOLD KROCKER, OF BRESLAU, PRUSSIA.

IMPROVEMENT IN PUMP-VALVES.

Specification forming part of Letters Patent No. 184,014, dated November 7, 1876; application filed March 25, 1876.

*To all whom it may concern:*

Be it known that I, BERTHOLD KROCKER, of Breslau, Prussia, Germany, have invented a new and Improved Differential Pump-Valve, of which the following is a specification:

The invention is illustrated in the accompanying drawing, in which—

Figure 1:
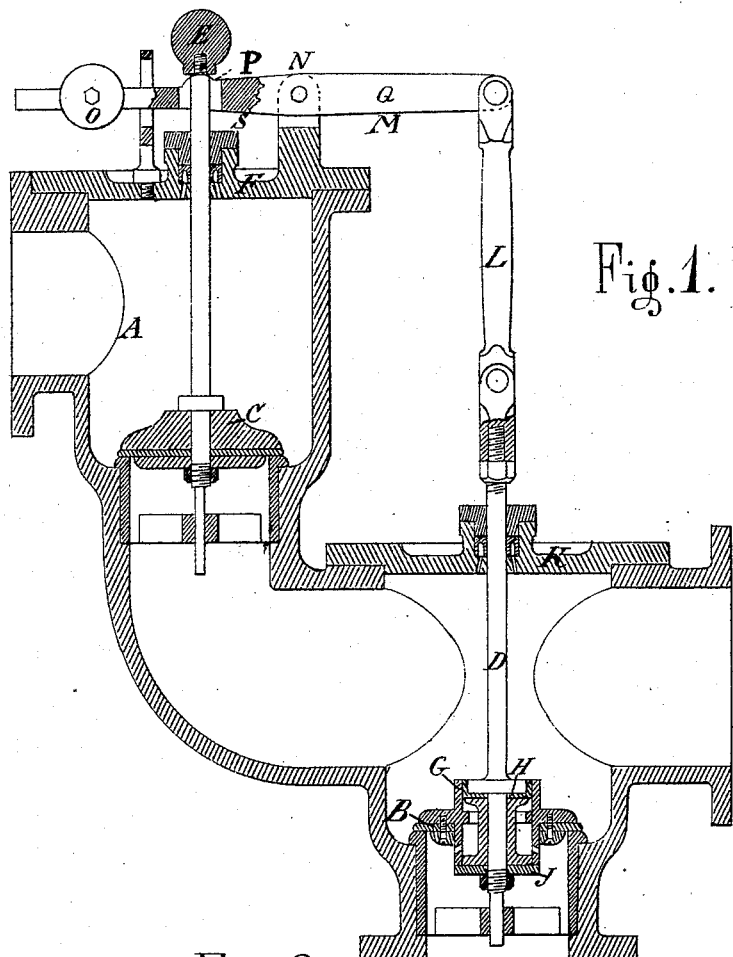
Figure 2:
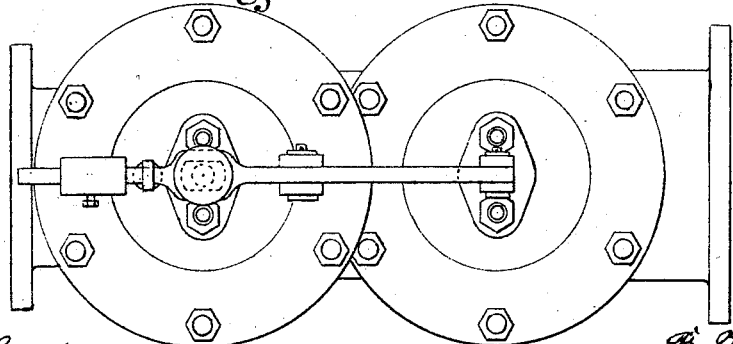

Figure 1 represents a vertical central section of my differential valve. Fig. 2 is a plan of the same.

My invention relates to valves of pumps for water or other fluids; and has the object to facilitate the opening of the discharge-valve and to avoid the shocks, which are so much the harder as the height of the lifted water-column increases.

To the body or the valve-chest A are fitted the seats of the suction-valve B and of the discharge-valve C, both consisting of a leather or rubber disk secured between two metallic plates by rivets or screws. The valve C is weighted directly with a weight, E, at the top of the valve-stem passing through the chest-cover F, to secure a tight closing of the valve. The suction-valve B contains a cylindrical opening or tube, G, and inside of this tube an annular projection, which serves as a seat for the differential valve H sliding, with its leather packing, in the upper part of the tube G. This valve is attached to a rod, D, passing through the second chest-cover K, and bearing below H a disk, J, which closes the lower end of the tube G when the valve H is in its highest position. Vent-holes are drilled in the lower part of the tube G to secure a ready outlet of the water confined in it. The rod D serves, consequently, as valve-stem for the valve B as soon as the sucking action of the pump begins. The area of the valve H is made so large that the pressure on it counterbalances the weight E to a certain degree and relieves the valve C of a corresponding part of its pressure. The rod D is connected, by the link L, to the longer arm G of the lever M, the fulcrum of which is at N. The other arm S of the lever M bears a weight, O, to counterbalance the link L, rod D, and valve H, and is provided with a sleeve-opening, through which the stem of the valve C passes, which sleeve supports the above-mentioned weight E. The proportion of the arms Q and S of the lever M is 2 : 1.

The working of this arrangement is as follows: At the moment when the sucking action of the pump ceases the valve B goes down to its seat, carrying with it the differential valve H in its relative highest position; and the sleeve P of the lever M just bears against the weight E. As soon as the pressure begins the differential valve H is forced down to its seat, acting on the valve C with double the power of the weight E. Consequently, the valve C is relieved of a pressure equal to double the pressure resting on the differential valve H, and is now easily lifted higher without any shock by the pressure of the rising water. The valve C closes at the end of the stroke of the pump, also the valve B, carrying with it the differential valve H in its relative highest position. Then the suction begins, and so on.

What I claim is—

1. The suction-valve of a pump composed of the annular valve B and the differential valve H, with its disk J, and connected, by means of two valve-stems, link L, and lever M, to the discharge-valve C, substantially as shown, and for the purpose set forth.

2. The differential valve H forming part of, and sliding inside, the annular suction-valve B, for the purpose set forth, in combination with the directly-weighted discharge-valve C and intermediate mechanism, substantially as shown.

This specification signed by me in presence of two witnesses this 31st day of December, 1875.

BERTHOLD KROCKER.

Witnesses:
 HERMAN KREISMANN,
 GERARD HAWRODE.